July 2, 1935.  W. J. REGAN  2,006,686

COUPLER CARRIER MECHANISM

Filed Jan. 2, 1931  5 Sheets-Sheet 1

Inventor
William J. Regan
By Ritter & Ritter
his Attorneys

July 2, 1935.  W. J. REGAN  2,006,686
COUPLER CARRIER MECHANISM
Filed Jan. 2, 1931   5 Sheets-Sheet 2
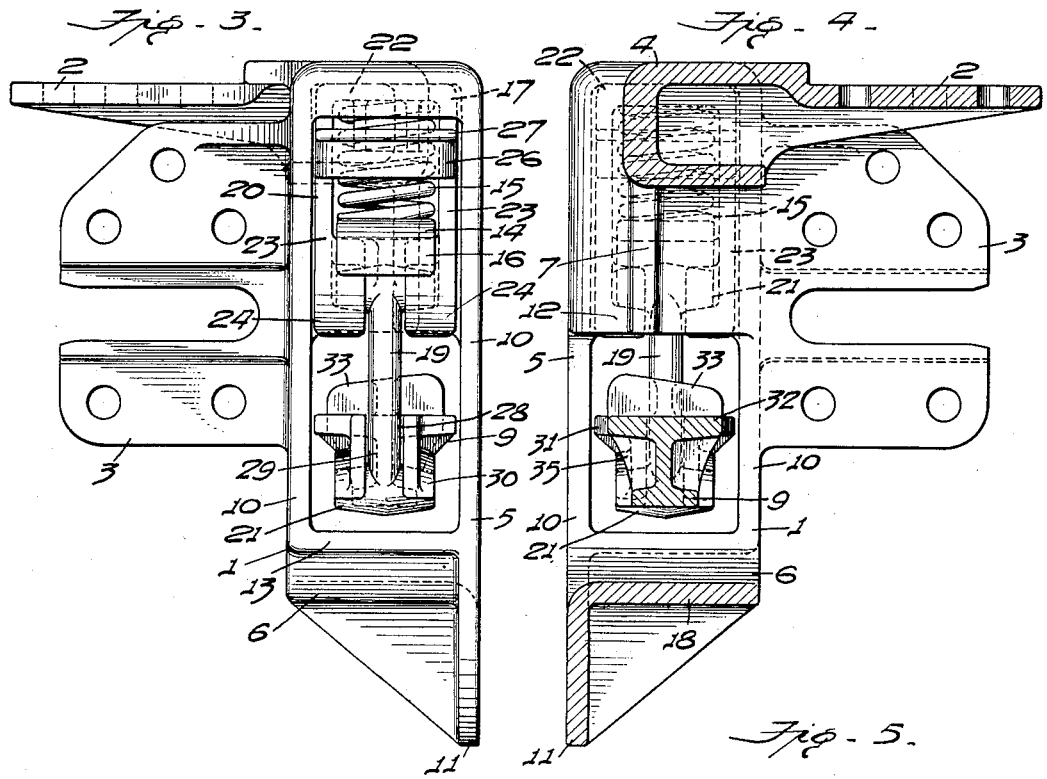
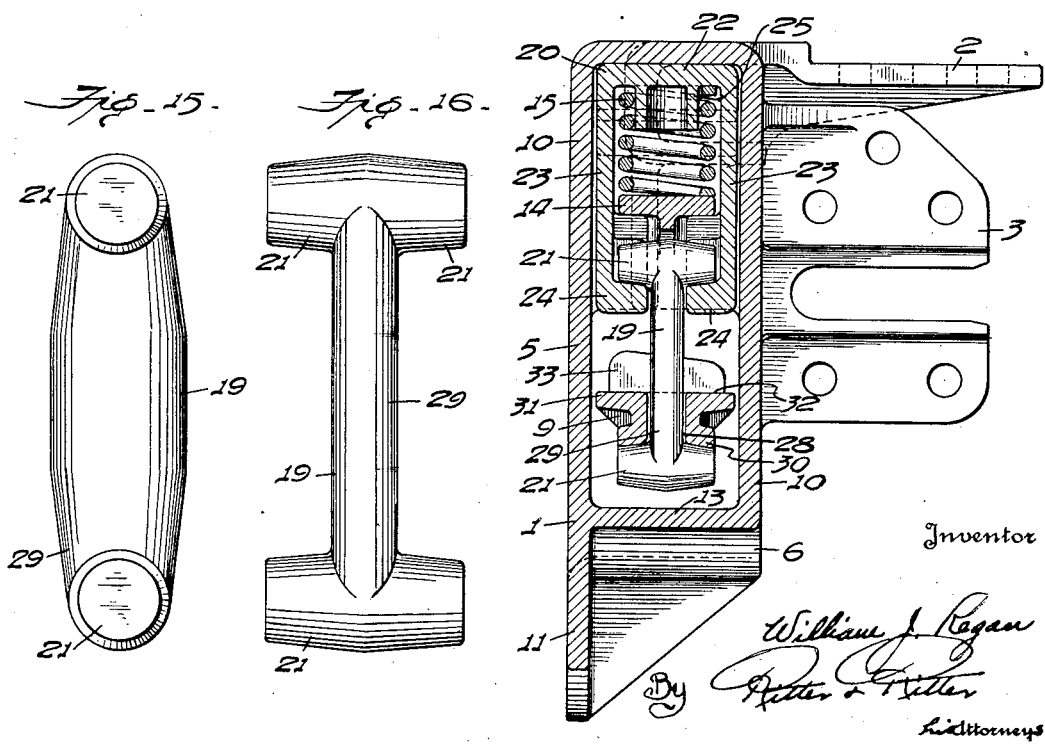

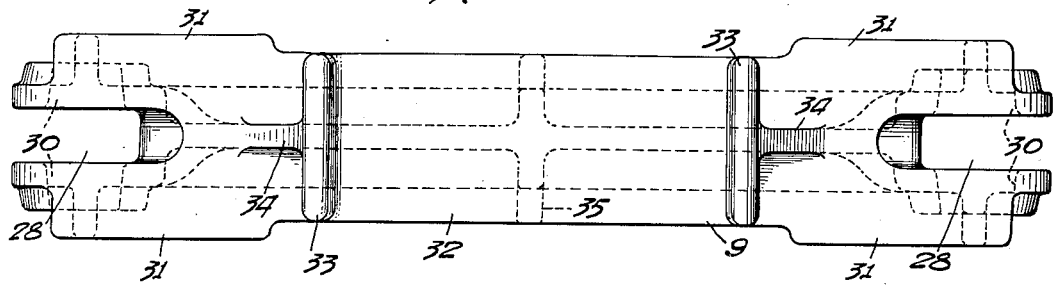
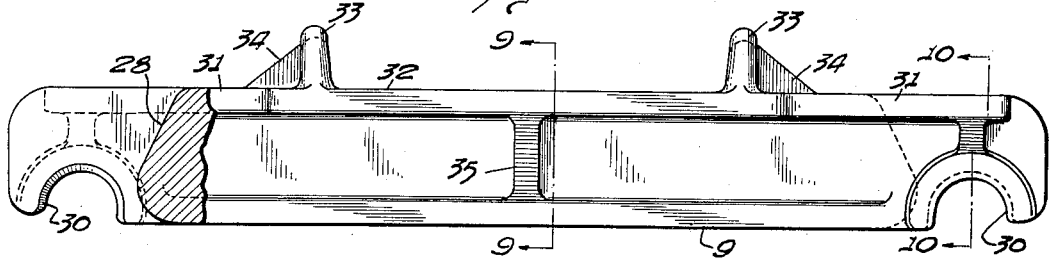
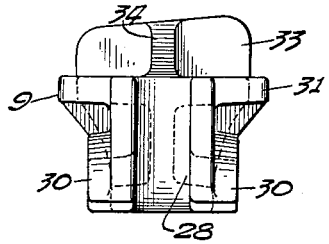 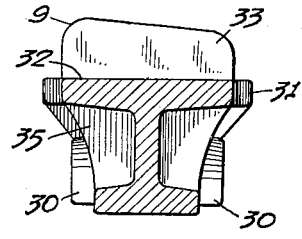 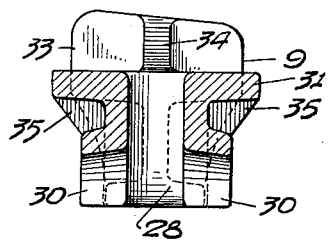
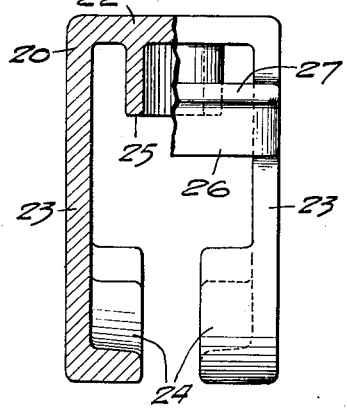 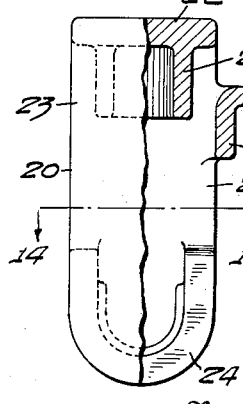 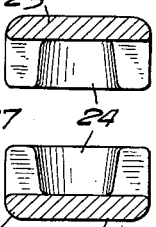

July 2, 1935.   W. J. REGAN   2,006,686
COUPLER CARRIER MECHANISM
Filed Jan. 2, 1931   5 Sheets-Sheet 4

Inventor
William J. Regan
By Ritter & Ritter
his Attorneys

July 2, 1935.    W. J. REGAN    2,006,686
COUPLER CARRIER MECHANISM
Filed Jan. 2, 1931    5 Sheets-Sheet 5
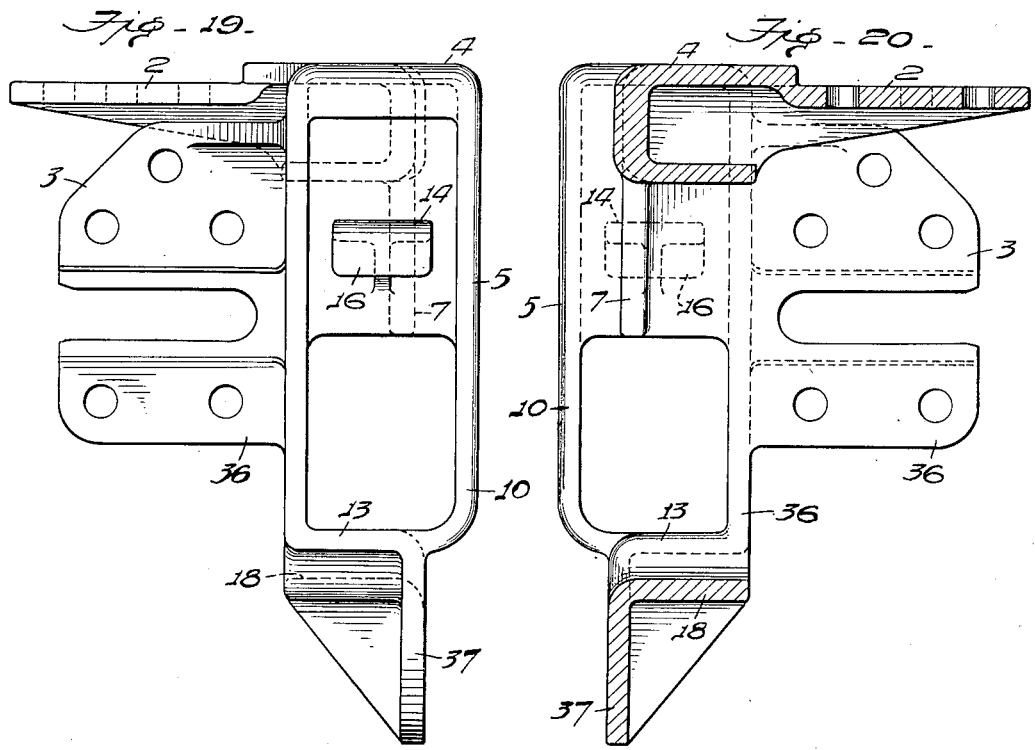
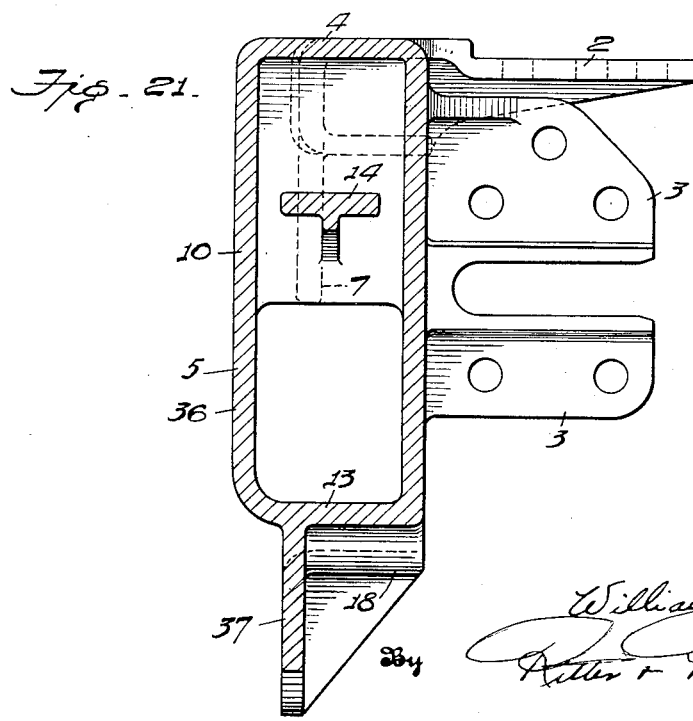

Patented July 2, 1935

2,006,686

UNITED STATES PATENT OFFICE 2,006,686

COUPLER CARRIER MECHANISM

William J. Regan, Pittsburgh, Pa., assignor to The McConway & Torley Company, Pittsburgh, Pa., a corporation of Pennsylvania Application January 2, 1931, Serial No. 506,220

11 Claims. (Cl. 213—21)

My invention relates to coupler carrier mechanism designed to afford support for a car coupler at a point somewhat to the rear of the head of the latter.

The principal object of the invention is to provide a coupler carrier, operating under the influence of gravity to center the car coupler, which is adapted to yield so as to obviate the wear upon the coupler that is due to certain vertical movements thereof resulting from the gravity centering of the coupler.

At the present time the common practice is to provide a clearance of three-quarters of an inch between the upper side of the coupler shank and the overlying portion of the striking casting attached to the car. When changes in the grade of the railway track or uneven portions of the track such as frequently occur at rail joints, etc., cause the car coupler to rise in the striking casting this clearance permits the coupler to adjust its position vertically to the extent of the clearance. But no provision is made for enabling the carrier to move downwardly with respect to the striking casting to compensate for track conditions inducing downward movement of the coupler with respect to the striking casting, for ordinarily the carrier upon which the coupler shank rests is either rigidly attached to the striking casting or car frame or else is supported by hangers or links which prevent the carrier from moving downward below the point corresponding to the position it normally occupies when the coupler is centered in the longitudinal axis of the car. Where hangers or links are employed to support the carrier so as to effect centering of the coupler under the influence of gravity, the upper ends of the hangers or links are usually pivotally supported in bearings rigidly connected to the striking casting either by being cast integral therewith or by being attached thereto. When so supported by links the wear upon coupler heads and knuckles is increased beyond that occurring when the support for the coupler is of the type in which the coupler carrier is rigidly attached to the striking casting or car frame, because when the coupler moves to either side of the center line of the striking casting, as occurs when the car passes around a curve in the track, the lateral swinging of the links in their bearings raises the coupler independently of any change of grade or unevenness of the track. The extent of raising of the coupler in the striking casting thus caused is governed by the amount of lateral movement of the coupler and, therefore, there is a corresponding decrease of the clearance above the coupler shank normally available for allowing the coupler to move upwardly in the striking casting to compensate for track conditions inducing lifting of the coupler.

When the coupler is not supported in a manner permitting it to move vertically with respect to the striking casting as may be required in response to changes in grade or unevenness of the railway track, the necessary adjustment of one coupler with respect to a mating coupler on the adjacent car of a train is accomplished by the sliding on each other of the contacting parts of the opposing couplers. In pulling this sliding takes place between the inner or pulling faces of the knuckles, while in pushing it occurs on the outer faces of the knuckles and the inner contour faces of the coupler heads. By my invention a gravity centering of the coupler is effected with the provision of means for permitting the coupler carrier to move up and down with respect to the striking casting or car frame so as to permit the coupler supported thereby to have vertical movements enabling it to adjust its position in response to track conditions.

A primary feature of the invention consists in supporting a coupler carrier through the instrumentality of a plurality of spaced hangers or links which are pivotally connected to the carrier, the respective links being pivotally supported by members which are yieldingly mounted upon a striking casting or car frame.

A further feature of the invention consists in supporting a coupler carrier by hangers or links which are rotatable with respect to the carrier and also with respect to means for supporting said links, said means being yieldingly supported on a striking casting or the car frame.

Another feature of the invention consists in providing a striking casting or car frame with a plurality of spring seats upon which springs are respectively mounted, said springs serving to support slidable members which in turn support pivotally movable hangers or links between which a coupler carrier extends and by which the carrier is supported with capability of shifting laterally in response to lateral swinging movements of the car coupler.

A still further feature of the invention consists in movably supporting a coupler carrier on a plurality of pivoted hangers or links which are respectively supported by members carried by springs, the said springs being supported on the striking casting or car frame and serving to yieldingly oppose downward movement of the link supporting members.

Other features of the invention pertaining to advantageous details of construction and relations of parts will hereinafter appear and be pointed out in the claims.

In the drawings illustrating a preferred form of the invention:

Figure 3 is a side elevational view of the mechanism.

Figure 4 is a vertical sectional view on the line 4—4, Figure 2.

Figure 5 is a vertical sectional view on the line 5—5, Figure 2, the hangers or links which supportingly engage the carrier being in elevation.

Figure 6 is a detail plan view of the coupler carrier.

Figure 7 is a detail view, partly in elevation and partly in vertical section, of the coupler carrier.

Figure 8 is a detail end elevation of the carrier.

Figure 9 is a sectional view on the line 9—9, Figure 7.

Figure 10 is a sectional view on the line 10—10, Figure 7.

Figure 11 is a detail view, partly in side elevation and partly in vertical section, of one of the yieldingly supported members forming pivotal bearings for the hangers or links.

Figure 12 is a view, partly in elevation and partly in vertical section, of the yieldingly supported member shown in Figure 11.

Figure 13 is a plan view of the member shown in Figures 11 and 12.

Figure 14 is a detail sectional view on the line 14—14, Figure 12.

Figure 15 is a detail side elevational view of one of the links which supportingly engages the carrier.

Figure 16 is a front elevational view of the link shown in Figure 15.

Figure 19 is a detail side elevational view of the modified form of the frame or striking casting.

Figure 20 is a vertical central section of the modified form of striking casting.

Figure 21 is a detail sectional view taken on the line 21—21, Figure 17.

Figure 1:
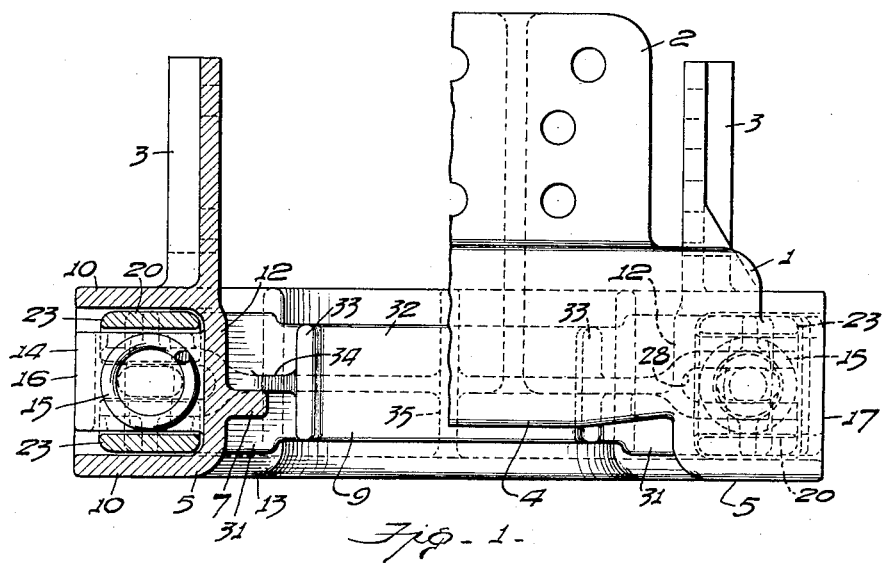
Figure 1 is a view partly in plan and partly in horizontal section of a coupler carrier mechanism embodying the invention.
Figure 2:
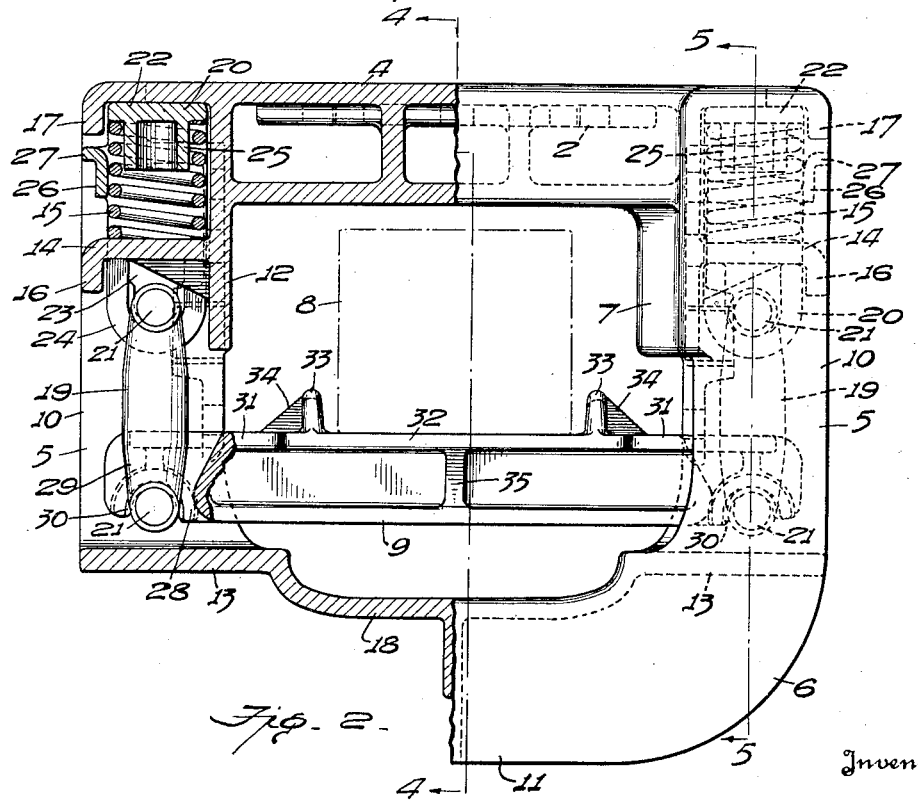
Figure 2 is a view of the mechanism, partly in front elevation and partly in vertical section, the relation of the shank of a car coupler thereto being shown in dot and dash lines.

In the drawings, 1 indicates a frame which preferably constitutes a striking casting fashioned as an integral member. Instead of being formed as an integral part of the car frame it is preferred to construct it as a separate casting having a rearwardly extending flange 2 whereby it may be riveted to the car end sill and having laterally spaced rearwardly extending slotted flanges 3 enabling it to be rigidly secured to the center sill of the car.

The frame 1 is preferably fashioned with an upper horizontal member 4, spaced side members 5 and a lower member 6 which forms a tie connecting the lower ends of the side members of the frame. The side members 5 are spaced laterally a sufficient distance to permit the coupler to have the desired range of horizontal swinging movement and each of them may advantageously be formed on its inner side with an inwardly extending projection 7 which serves as a stop to limit the sidewise movement of the coupler 8. The lower ends of the stops 7 are located at a sufficient elevation to avoid interference with the coupler carrier 9 when the latter is shifted in response to swinging movements of the coupler. The side members 5 of the frame may advantageously be formed with longitudinally spaced parallel walls or plate-like portions 10, those at the front of the striking casting preferably being continuous with the flange 11 with which the bottom member 6 of the frame may be advantageously provided. Toward their upper ends the side walls 10 of the frame are rigidly connected by tie webs 12, while the lower ends of the plate-like portions 10 are rigidly connected and tied together by the horizontally extending wall 13 at the lower side of the frame. The frame 1 is thus provided at its sides with outwardly opening recesses for receiving the devices by which the carrier 9 is yieldingly supported, the frame thereby forming a housing for said devices.

The frame 1 is provided at its sides with spring seats 14 forming abutments for the springs 15 by which the coupler carrier 9 is yieldingly sustained. Each spring abutment is preferably fashioned as a horizontally extending lug or plate integrally connected to and extending outwardly from the adjacent tie web 12 in spaced relation to the side walls or side plates 10 of the frame, the outer end of the spring seat being provided with a downwardly extending flange or lip 16 which, as will hereinafter appear, serves to maintain the carrier supporting devices in assembled relation to the frame. As a further means for retaining the carrier supporting devices in assembled relation, the frame 1 is preferably provided at its upper end on opposite sides with lugs or flanges 17 which extend downwardly a short distance below the upper ends of the spring receiving recesses in the side frame. These depending flanges 17 respectively overlap the upper ends of the spring supported members forming pivotal bearings for the swinging links upon which the carrier 9 is supported. To provide clearance for the coupler head in buffing the central portion 18 of the horizontal wall 13 at the bottom of the frame is depressed, thus enabling the outer ends of the walls 13 to be brought into closer proximity to the underside of the carrier 9. This is advantageous because in the event of breakage of any of the devices by which the carrier is movably supported the outer ends of the wall 13 of the frame serve to arrest downward movement of the carrier with a minimum drooping of the coupler.

The devices by which the carrier 9 is yieldingly supported with capability of shifting sidewise in the frame 1 preferably comprise a plurality of links arranged in pairs on opposite sides of the frame, the links of each pair being pivotally connected and yieldingly mounted on the frame so as to be vertically movable with respect to the latter. One link 19 of each pair is pivotally connected at its lower end to the carrier 9, while the associated link 20 from which it depends and to which it is pivoted is yieldingly supported by the adjacent spring 15. The links 19 may be conveniently fashioned at their ends with oppositely extending trunnions 21 which preferably are of conical form. The upper links or hangers 20, which preferably slide vertically in the frame 1, without rotation, may advantageously be formed as yokes closed at their upper ends to provide seats 22 for the respective springs 15 and having spaced parallel depending arms 23 which fit closely between the spaced walls 10 of the side members of the frame so as to be guided by the latter. The arms 23 of each yoke receive the adjacent spring 15 between them and pass upon opposite sides of the neighboring spring seat 14. At their lower ends the arms of each yoke are preferably provided on their opposed sides with pockets or recesses forming suitably curved bearings 24 for receiving and cooperating with the trunnions 21 at the upper end of the associated link 19. These trunnion bearings are of sufficient depth to prevent the possibility of accidental escape of the trunnions. To maintain the upper end of the spring 15 in proper position, the upper end of the yoke 22 is preferably formed with a downwardly extending thimble or boss 25 which enters the bore of the spring. Intermediate its ends each yoke 20 is integrally formed with a cross brace 26 which not only connects the yoke arms 23 but which also serves to maintain the adjacent spring 15 in proper operative position. The upper end of the cross brace 26 of each yoke is in spaced relation to the lower end of the adjacent lug 17 at the upper end of the frame and each cross brace is preferably flanged outwardly as indicated at 27 to form a seat permitting a pry bar or the like to be employed in dismantling the structure.

The carrier 9 upon which the shank of the car coupler rests is pivotally supported on the lower ends of the links 19. To this end the carrier is preferably provided at its opposite ends with slots 28 for receiving the intermediate portions or stems 29 of the respective links 19, the slots being appropriately formed to afford suitable clearance for the stems of the links when the coupler carrier shifts sidewise. The carrier is fashioned at its ends with downwardly opening curved recesses forming bearings 30 conforming to the surfaces of the trunnions 21; and in order to limit its forward and rearward movement when the coupler is pulled out under draft or when the coupler is pushed inward under buffing, the carrier preferably has the outer or end portions of its upper wall widened, as at 31, so as to stand closely adjacent to the inner faces of the vertical walls 10 at the sides of the frame member 1. The intermediate portion 32 of the upper wall of the carrier, forming the bearing or seat for the coupler shank is of somewhat less width than the ends of the carrier in order to provide clearance for the coupler head when the coupler is moved to its extreme rearward position for fully compressing the draft gear. Projecting upwardly from the top wall of the carrier 9 are spaced lugs or flanges 33 which may advantageously be braced by flanges 34. The lugs or flanges 33 receive the shank of the coupler between them and constitute means for causing the carrier 9 to shift transversely in the frame 1 in response to lateral swinging movements of the coupler. As shown in the drawings, the carrier 9 may be formed as an I-beam whose upper flange is somewhat wider than its lower flange and which is provided intermediate its ends with reinforcing flanges 35.

In assembling the mechanism the carrier 9 is placed in assembled position after the coupler has been applied to the car. The springs 15, the links 19 and the spring yokes 20 are brought into assembled relation with the frame 1 in the following manner: The trunnions at the upper end of each of the pivoted links 19 are placed in the bearings 24 at the lower end of the sliding link or spring yoke 20 associated therewith. Each of the springs 15 is then compressed until it is able to pass between the lower end of the thimble or boss 25 of the link 20 and the upper surface of the walls forming the trunnion receiving recesses in the yoke. After the pivoted links 19, the sliding links 20 and the springs 15 have thus been assembled, a clamp of the ordinary C type with screw adjustment is then applied so that its rigid arm extends under the spring and above the top central portion of the link 19 between the trunnion bearings 24 at the lower or forked end of the spring yoke, the adjustable or screw end of the clamp being placed over the top of the upper wall 22 of the yoke. By manipulating the screw of the clamp the spring 15 is then compressed the necessary distance to allow the upper end of the spring yoke 20 and the compressed spring to be partially entered into the space between the lower end of the downwardly extending lug at the upper end of the frame and the top of the spring seat 14. When these parts have been entered as far as the clamp will permit they can be driven home to final assembled position. If the frame is an independent casting and not an integral part of the car frame, the springs 15, sliding links or spring yokes 20 and the carrier hangers or links 19 may be assembled on the frame either before or after the frame has been attached to the car.

After the shank of the car coupler has been inserted in the opening in the frame 1 provided therefor, the coupler is jacked upward or otherwise raised until the top surface of its shank comes in contact with the lower surface of the upper horizontal member 4 of the frame. With the coupler in this position a sufficient space is afforded to enable the carrier 9 to be slid into the frame 1 beneath the coupler shank through the space bounded by the inside surfaces of the vertical walls 10 and the upper surface of the horizontal wall 13 at the bottom of the frame. The end of a pinch bar or lever is then inserted through the opening between the trunnion bearings 24 at the lower end of the yoke 20 so as to cause it to rest on the upper end of the link 19 while fulcruming upon the lower surface of the downwardly extending lip 16 of the spring seat 14. By then moving the outer end of the lever upwardly the hanger or link 19 will be forced downwardly, compressing the spring 15 until the bottom trunnions 21 of the carrier hanger or link are lowered sufficiently to permit them to pass under the carrier 9 and into the trunnion bearings 24 of the latter, the stem 29 of the link then extending through the slot 28 of the carrier.

After the links 19 have thus been brought into assembled relation with the carrier 9, the coupler is lowered to its working position. As it is necessary to compress the springs 15 while the coupler occupies its highest possible position in the frame 1 in order to assemble the carrier 9 with respect to the pivoted links 19, and as such conditions cannot obtain under normal working conditions, the carrier cannot become accidentally released from the devices by which it is yieldingly supported. Moreover, as the downwardly extending lips 16 of the spring seats 14 as well as the downwardly extending lugs 17 at the upper end of the frame 1 are of greater length than the maximum downward movement of the carrier 9, the lips 16 and lugs 17 act as retainers to prevent the spring supported links or hangers 20 from escaping from their working positions on the frame.

In dismantling the device the coupler is jacked upwardly to its highest position in the frame 1 and the carrier 9 is then disconnected from the links 19 by forcing the latter downwardly with the aid of a lever in the manner heretofore described. To disconnect the pivoted links 19 from their supporting links or yokes 20 requires that the springs and yokes shall first be removed from the striking casting or frame 1. This may be accomplished by employing a pinch bar to compress the spring until the upper end of the spring yoke 20 is slightly below the lower surface of the adjacent downwardly extending lug 17 of the frame, thus also bringing the top surface of the walls forming the trunnion bearing 24 below the lower surface of the downwardly extending lip 16 of the spring seat 14 with which the frame 1 is provided. To effect this compression of the spring the pry bar is fulcrumed on the lower end of the lip 16 and its end bears downwardly against the top central portion of the link 19, in the same manner as heretofore described. When the yoke 20 has thus been forced downwardly a sufficient distance the compressed spring is blocked so as to prevent the yoke from returning to normal position. The blocking of the spring may be accomplished by inserting a block or bar about one inch in width and approximately one and one-half inches deep between the top surface of the spring yoke cross-tie wall 26 and the lower surface of the downwardly extending lug or wall 17 of the frame, the block or bar being inserted approximately on the fore and aft center line of the spring. After the spring yoke has thus been blocked, a pinch bar can be inserted at the front or rear of the block and fulcrumed on the lower surface of the downward extension or lug 17 of the frame with its inner end positioned back of the upper portion of the cross-tie member 26 of the spring yoke. The spring yoke and spring can then be forced outwardly by the pinch bar or lever so as to disassemble them from the striking casting 1. The thimble or yoke 25 with which the spring yoke is provided preferably extends well down into the spring so that the latter will come out of the striking casting or frame along with the yoke. If desired two pinch bars may be employed in removing the spring and spring yoke from the frame, one of the bars being inserted from the front and one from the rear.

Figure 17:
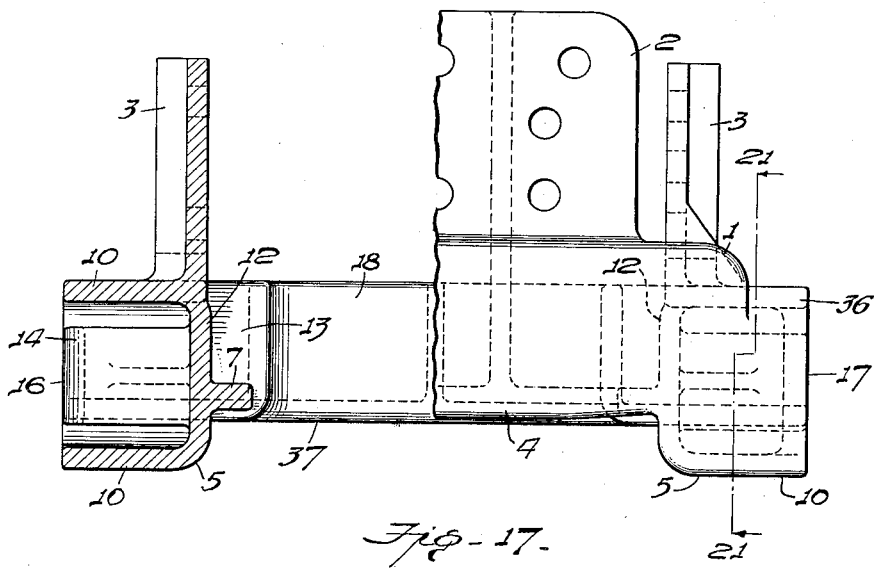
Figure 17 is a detailed view, partly in plan and partly in horizontal section, of a slightly modified form of the frame or striking casting.
Figure 18:
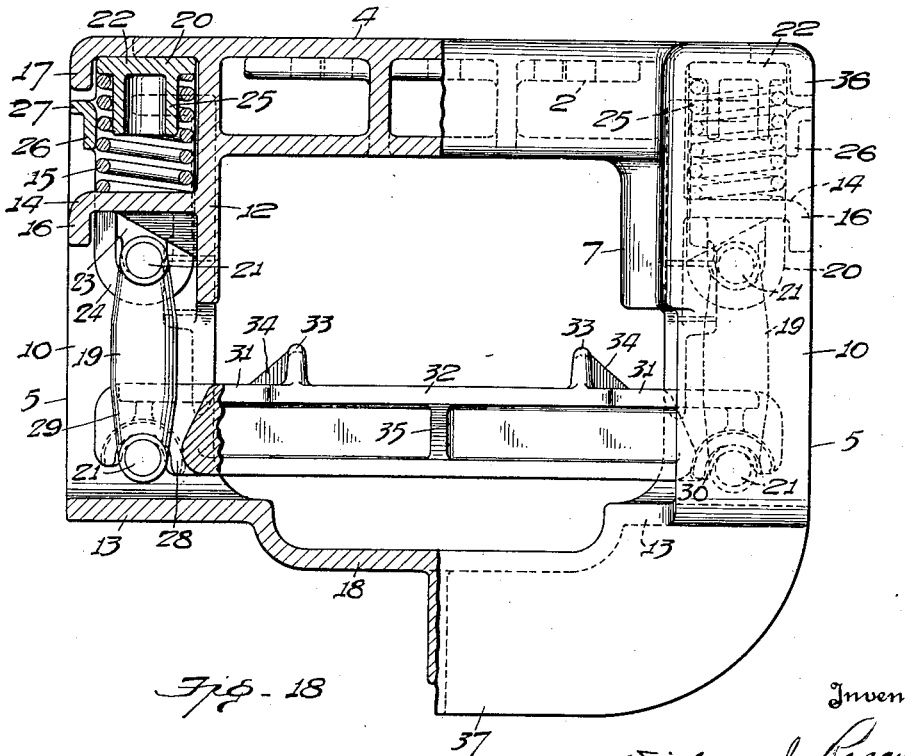
Figure 18 is a view, partly in front elevation and partly in vertical section, showing a coupler carrier mechanism employing the modified form of frame illustrated in Figure 17.

In the modified form of construction illustrated in Figures 17 to 21 inclusive a frame 36 employed which differs from the frame 1 heretofore described in that the bottom member or bottom cross-tie 37 with which it is provided is positioned rearwardly of the front side walls 10 of the frame, thus providing clearance permitting the striking casting to be employed with car couplers, which are designed to be unlocked from below by mechanism of the rotary release type such, for example, as is associated with the present type E-coupler. Except for this difference in the form of the frame or striking casting, the mechanism illustrated in the modified construction is the same as that heretofore described and, accordingly, corresponding structural details have been identified by the corresponding reference numerals.

When the parts are in normal working or assembled position with the coupler carrier centralized, the springs 15 preferably have an initial compression or load somewhat in excess of the weight of the parts yieldingly supported by the springs, that is to say, in excess of the weight of the coupler head and adjacent portion of the coupler shank, the carrier 9 and the links 19 and 20. In the construction shown this initial load of the spring is obtained by making the space between the spring seat 14 and the under side of the top wall of the striking casting frame 1 such as to effect the desired initial spring compression when the springs are assembled with the spring yokes in the frame.

I claim:

1. A coupler carrier mechanism involving a frame having laterally spaced side members and a bottom member rigidly connected thereto, a plurality of pivotally connected links at each side of said frame, the said links at each side of the frame being pivotally connected together to enable them to swing with respect to each other and one of the links at each side of the frame being slidable with respect to said frame and being formed with a plurality of laterally spaced arms, a plurality of springs respectively interposed between said frame and said slidable links and respectively disposed between said arms of said slidable links, and a coupler carrier movable with respect to said pivoted links and supported thereby.

2. A coupler carrier mechanism involving a frame provided with laterally spaced spring seats fixed with respect thereto, a pair of rigid links at each side of the frame, one of the links of each pair being slidable with respect to the frame and the other link of each pair being pivotally mounted on the adjacent slidable link and depending from the latter, springs respectively interposed between said spring seats of the frame and the said rigid slidable links, and a coupler carrier supported by and movable with respect to said depending links.

3. A coupler carrier mechanism involving a plurality of laterally spaced rigidly connected spring seats, springs respectively cooperating with said spring seats, a plurality of unitary links respectively supported by said springs, a plurality of links pivotally connected respectively to said spring supported links, and a coupler carrier supported by and movable with respect to said last-named links.

4. A coupler carrier mechanism involving a frame having side members each of which is provided with spaced walls forming a recess which is open at the side, said frame being provided with spring seats respectively extending between the spaced walls of said side members, spring yokes respectively positioned in said recesses, springs respectively interposed between the spring yokes and the spring seats, a coupler carrier, and spaced links respectively connecting said carrier to the spring yokes, said frame being provided with means respectively overlapping said spring yokes for normally retaining the latter in said recesses of the side members of the frame, each of said spring yokes having a plurality of spaced arms passing on opposite sides of the said spring and spring seat associated therewith, and each of said links being pivotally connected to said coupler carrier and to one of the spring yokes.

5. A coupler carrier mechanism involving a frame having side members provided with longitudinally spaced walls, and having spring seats respectively extending into the spaces between said walls, springs respectively mounted on said spring seats, a plurality of spring yokes respectively supported by said springs, each of said yokes being positioned between the said spaced walls at opposite sides of the frame and being formed with spaced arms extending on opposite sides of the respective springs and spring seats, said yoke arms being rigidly connected at their upper ends and being connected by a cross brace between their ends and being provided at their lower ends with curved bearings, a coupler carrier, and a plurality of links for supporting the couple carrier, each of said links being pivotally connected to said carrier and being pivotally supported in said curved bearings of one of said yokes.

6. A coupler carrier mechanism involving a frame having vertically spaced top and bottom members and laterally spaced side members, each of said side members being formed with spaced walls, a coupler carrier projecting at its ends into the spaces between said walls of the respective side members of the frame, a plurality of laterally spaced link devices suspended from said frame for supporting said coupler carrier, and a plurality of springs respectively interposed between said frame and the link devices, each of said link devices being pivotally connected to said carrier, said bottom member of the frame being formed with a horizontally extending wall projecting under said coupler carrier and provided with a depressed central portion, and said coupler carrier being widened at its ends for cooperation with said spaced walls of the side members of the frame.

7. A coupler carrier mechanism involving a frame provided with side members having longitudinally spaced walls and provided with spring seats respectively extending between said walls intermediate of the height of said side members, each of said spring seats being formed at its outer end with a depending lip, a plurality of springs respectively supported by said spring seats, a plurality of yokes respectively supported by said springs, a coupler carrier, and a plurality of laterally spaced links for connecting the coupler carrier to the respective yokes, each of said yokes being formed with spaced arms provided at their lower ends with recessed portions constituting pivotal bearings for the respective links, said bearing portions being positioned beneath the respectively adjacent spring seats and being overlapped by the said lip adjacent thereto, said links being pivotally connected to the coupler carrier, and said coupler carrier being provided with means adapted to receive the shank of a car coupler between them.

8. A coupler carrier mechanism involving a frame, a plurality of pairs of links, a coupler carrier supported by said links, and springs respectively interposed between each pair of links and the frame, one link of each pair being provided with laterally spaced arms free at their lower ends and being provided at its lower end with conically curved recesses and one link of each pair being provided at its upper end with conically curved trunnions positioned in said conically curved recesses.

9. A coupler carrier mechanism involving a frame, a plurality of pivotally connected links at each side of said frame, one of the links at each side of the frame being slidable with respect to said frame and the latter being formed with side members engageable by said slidable links for guiding said slidable links, a plurality of springs respectively interposed between said frame and said slidable links, and a coupler carrier movable with respect to said pivotally connected links and supported thereby.

10. A coupler carrier mechanism involving a coupler carrier and means for yieldingly supporting said coupler carrier, said means involving laterally spaced devices movably connected to said coupler carrier and each comprising a plurality of pivotally connected links and spring means for yieldingly supporting said links.

11. A coupler carrier mechanism involving a frame having vertically spaced top and bottom members and laterally spaced side members, each of said side members being formed with a forward wall and a rear wall in spaced relation thereto, a coupler carrier projecting at its ends into the spaces between said walls of the respective side members of the frame, a plurality of laterally spaced link devices suspended from said frame for supporting said coupler carrier, and a plurality of springs respectively interposed between said frame and the link devices, each of said link devices being pivotally connected to said carrier, and said bottom member of the frame being provided with a depressed central portion whose forward face is disposed rearwardly of said forward walls of the side members of said frame, said bottom member being provided on opposite sides of said depressed portion with laterally spaced portions extending under said carrier.

WILLIAM J. REGAN.